United States Patent Office 3,239,755
Patented Mar. 8, 1966

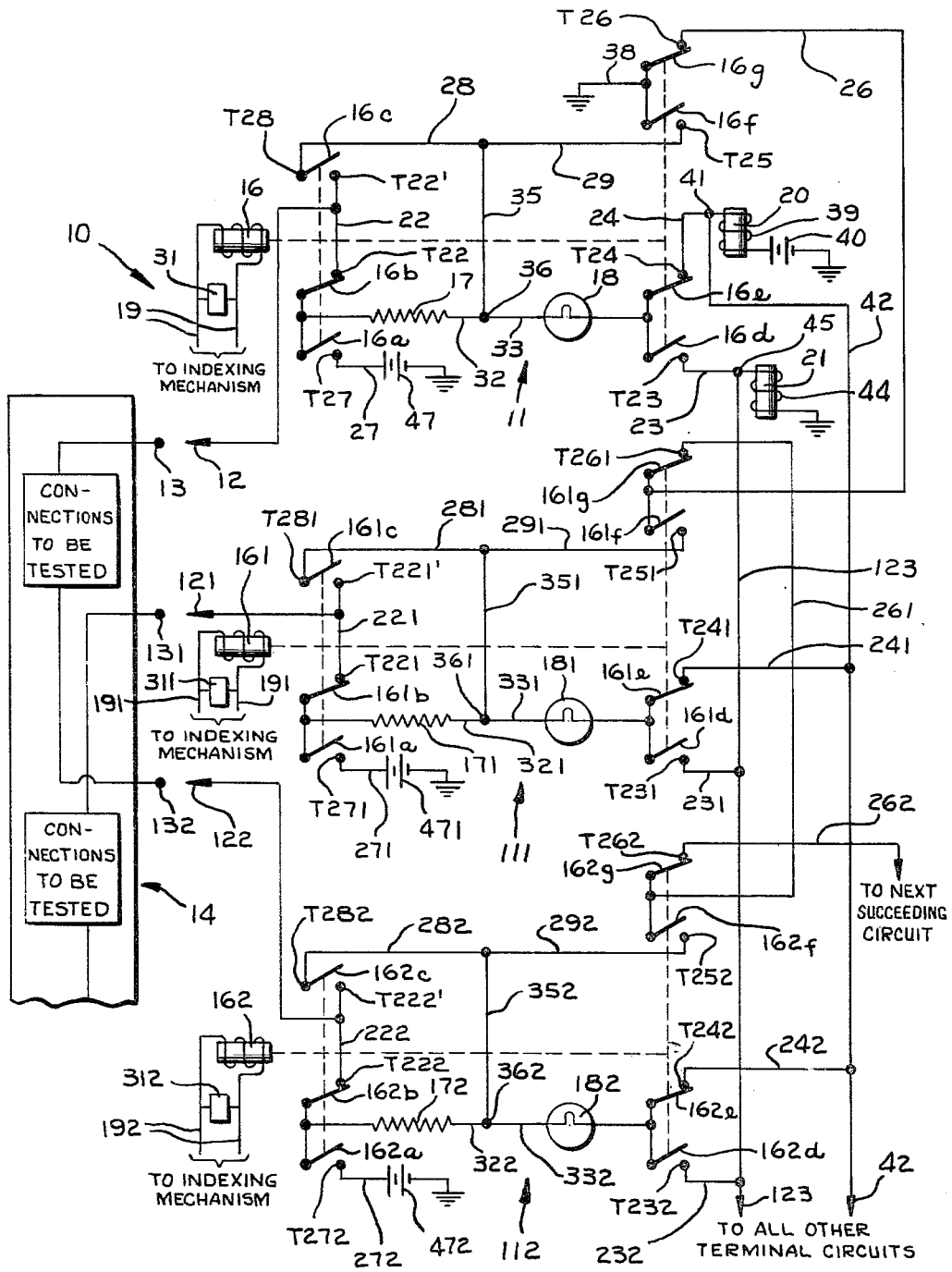

3,239,755
TEST CIRCUITRY FOR TESTING ELECTRICAL APPARATUS FOR CONTINUITY OF CIRCUITRY BETWEEN TERMINALS THEREIN
Arthur J. Ehlschlager, Columbus, Ohio, assignor to Western Electric Company, Incorporated, New York, N.Y., a corporation of New York
Filed Jan. 12, 1962, Ser. No. 165,846
3 Claims. (Cl. 324—73)

This invention relates generally to an electrical test device, and more specifically to a test device that tests for continuity in the connections between the terminals of a unit to which the test device is connected.

In the manufacture of communications equipment, the several units which comprise the complete equipment may be manufactured at several different locations, the units being thereafter assembled at some common location to form the complete equipment. It is desirable from a testing standpoint that each unit be tested before assembly since the problem of isolating defects in the circuitry thereof increases as the complexity of the circuitry increases, and the complexity of the circuitry increases as the number of interconnected units increases.

Test devices are or can be made available which can be connected to the units after their assembly to detect and indicate a plurality of defects in the unit. However, the internal circuitry of such test devices is quite complex and in many instances more complex than the circuitry of the unit which it is testing. As the complexity of the internal circuitry of the test device increases, the reliability of the device correspondingly decreases, and consequently from the standpoint of reliability it is desirable to have relatively uncomplex internal circuitry incorporated in the test device.

In general, a continuity test of the connections in the unit is a type of test which should be performed before the individual units are assembled, and it is broadly an object of this invention to provide a test device for this purpose, the internal circuitry of the test device being relatively uncomplex in comparison to the internal circuitry of other test devices.

More specifically, it is an object of this invention to provide a test device which can be either automatically or manually operated to test a plurality of connections in a unit to which the device is connected for continuity.

Another object of this invention is to provide a test device in accordance with the foregoing object which will provide an indication as to the location of the defect in the connection of the unit under test, and which further automatically interrupts testing when a defect is found.

Still another object of this invention is to provide a test device that will indicate continuity or lack of continuity in the circuits under test and which can be readily incorporated with, and controlled by, existing automatic indexing mechanisms so that the testing operations of the test device can be performed automatically.

The test device of this invention comprises visual indicating means for indicating the presence of an open or shorted condition in connections between a plurality of terminals of a unit under test. A test circuit, comprising a plurality of branch circuits respectively associated with the terminals to be tested, circuit connects the indicating means to the terminals, and two power supplies are selectively connected to the circuit for energizing the indicating means when the connections between the terminals are either shorted or open. As will become more evident hereinafter, each branch circuit may be visualized as comprising a continuity test circuit portion, which is capable of indicating open circuit conditions between specified terminals under test, and a short-circuit test portion, which is capable of indicating short-circuiting of the terminals to ground. A ground connection is also selectively connected in each branch of the test circuit and shunts the first power supply from the indicating means when the ground traces through the connections between the terminals. The two power supplies and the ground connection are selectively connected and disconnected from the branch circuits by relays preferably under the control of an indexing mechanism. The relays in their normal position connect the second power supply to the branch circuits and disconnect the first power supply and the ground connection so that a false ground on the connection of the unit under test completes a circuit between the second power supply through the indicating means to the false ground. The relays in their operated position disconnect the second power supply from the branch circuits and connect the first power supply through the indicating means to ground. The operated relays also introduce a ground on the first energized branch circuit which shunts out the first power supply, de-energizing the indicating means. An open circuit in the connections prevents this ground from tracing through the connections and grounding the indicating means from the first power supply on subsequent circuits.

Other objects, advantages and aspects of the invention will appear from the following detailed description of a specific embodiment thereof, when taken in conjunction with the appended drawing, in which the single figure is a schematic diagram of a test circuit in accordance with a preferred embodiment of the invention.

Referring now to the drawing for a more complete understanding of the invention, the test device 10 comprises a plurality of similar interconnected branch or terminal circuits 11, 111, 112, the number of terminal circuits being equal to the number of terminals of the unit 14 which are to be tested for continuity. While only three terminal circuits are shown by the drawing, it will be apparent to those skilled in the art that the number of terminal circuits required will be determined by the number of terminals under test in the unit 14. The terminal leads 12, 121 and 122 of the terminal circuits 11, 111, and 112, respectively, are connected to respective terminal leads 13, 131 and 132 of the equipment 14, each set of leads being preferably embodied in a suitable multi-plug and receptacle (not shown), so that the test set 10 can be readily plugged into the unit 14 with the terminal leads thereof in proper connection with the terminal leads of the unit 14. As shown in the drawing, the terminal leads 13 and 132 form the terminals for a circuit which incorporates the connections which are to be tested for continuity.

Each terminal circuit 11, 111 and 112 of the test set 10 respectively includes a relay 16, 161 and 162, a current limiting resistor 17, 171 and 172, and a visual indicating element, designated by the numerals 18, 181 and 182. In addition, two relays 20 and 21 are provided which are common to all terminal circuits. In the embodiment of the invention illustrated in the drawing, the indicating elements are shown as neon lamps; however, it will be appreciated that the particular type of indicating element employed in the test set 10 will ordinarily be a matter of choice, and that neon lamps are shown merely for illustrative purposes.

The relays 16, 161 and 162 are designed to selectively open and close certain of the contacts 16a–16g, 161a–161g, and 162a–162g, respectively. The relays of the test device 10 are energized in groups as required in a sequence determined by a control mechanism which may take the form of a conventional stepping switch (not shown) or indexing mechanism (not shown) of the type that includes a perforated coded tape or card and a transmitter that senses the codes on the tape or card and sends electrical impulses corresponding thereto to the relays. The control mechanism may also take the form of a series of manually operated switches (not shown), as will be evident to those working in the art. In order to close the contacts associated with these relays for predetermined periods of time, conventional hold circuits, referred to by numerals 31, 311 and 312, are connected to the leads 19, 191 and 192 respectively, the hold circuits including lock-in contacts (not shown) that are normally open, but close to keep each relay pair energized until completion of the particular test.

In summary, a pair or a group of relays, as for example relays 16 and 162, are operated to test each pair or group of terminals connected internally in the unit 14, and each pair or group of relays may be energized in any desired sequence and held in the energized position until completion of the particular test by conventional control mechanism and associated circuitry. The connections between terminal leads of the test device 10 and the unit 14 must correspond to the sequence of relay operation or program as established by the particular control mechanism employed, or vice versa.

As shown in the drawing, prior to energization of the relays 16, 161 and 162, the contacts 16b, 16e and 16g; 161b, 161e, 161g; 162b, 162e and 162g, respectively, connect contact terminals T22, T24 and T26; T221, T241 and T261; T222, T242 and T262; respectively, to their respective leads 22, 24, 26; 221, 241 and 261; 222, 242, and 262. Upon energization of the relays 16, 161 and 162, the respective normally open contacts 16a, 16c, 16d, 16f; 161a, 161c, 161d, 161f, 162a, 162c, 162d, 162f, contact respective contact terminals T27, T22', T23, T25; T271, T221', T231, T251; T272, T222', T232 and T252, provided at one end of the respective leads 27, 28, 23, 29; 271, 281; 231, 291; 272, 282, 232 and 292. The leads 28, 281 and 282 are respectively connected at one end thereof to respective terminals T28, T281, and T282, and at the other end thereof to one end of the leads 29, 291 and 292, respectively.

The terminal leads 12, 121 and 122 of the relays 16, 161 and 162 are connected to the leads 22, 221 and 222, respectively having formed at the ends thereof contact terminal pairs T22, T22'; T221, T221'; T222 and T222', respectively. The ends of the leads 32, 321 and 322, and the ends of the leads 33, 331 and 332 form respective common terminals 36, 361 and 362 between the resistors 17, 171 and 172 and the lamps 18, 181, 182, respectively. The other ends of the leads 32, 321 and 322 are respectively connected to the contact pairs 16a, 16b; 161a, 161b; 162a, and 162b and the other ends of the leads 33, 331 and 332 are respectively connected to the contacts pairs 16d, 16e; 161d, 161e; and 162d, 162e.

Referring now to the terminal circuit 11, the contacts 16f and 16g are grounded by a lead 38 and the lead 26 is grounded by the contact 16g closing the circuit between the grounded lead 38 and the lead 26 prior to energization of the relay 16, the lead 26 also grounding contact pairs 161f and 161g in the terminal circuit 111. The relay 20 includes a coil 39 thereon, one end of the coil being connected to the positive side of a battery 40, and the other end of the coil 39 being connected at a junction 41 to the leads 24 and 42.

In the terminal circuits 111 and 112, the leads 241 and 242 connect the contact terminals T241 and T242, respectively, to the lead 42. The relay 20 may be regarded as an open check relay since it will be energized by the battery 40 to which it is connected in a manner described in detail hereinafter if a false ground is detected in the connections in the unit 14. The lead 261 connects the terminal T261 in terminal circuit 111 to the contacts 162g and 162f in the circuit 112. The lead 262 connects the terminal T262 to corresponding contact pairs in the next succeeding circuit.

The relay 21 includes a coil 44 thereon, one end of the coil 44 being connected to ground as shown, the other end of the coil 44 being connected to the leads 23 and 123 at a junction 45. The relay 21 can be regarded as a ground check relay since this relay will be energized when a faulty open circuit breaking the ground path exists in the connections under test. Relays 20 and 21 when energized close normally open contacts (not shown) which stop the test device 10 to enable defects to be identified and corrected by the operator. The lead 231 in the terminal circuit 111 and the lead 232 in the terminal circuit 112 are connected to the lead 123.

The leads 27, 271 and 272 connect the positive sides of batteries 47, 471 and 472, respectively, to the contact terminals T27, T271 and T272, respectively, the negative sides of the batteries 47, 471 and 372 being grounded. The voltage of the batteries 47, 471 and 472 should be equal, and, in a typical instance, the voltage produced by these batteries as well as battery 40 would be 135 volts. One end of each lead 35, 351 and 352 in the terminal circuits 11, 111 and 112, is respectively connected to the junction 36, 361 and 362, the other end of these leads being respectively connected to the junction formed by lead pairs 28, 29; 281, 291; and 282, 292.

In order to facilitate an understanding of the operation of the test device 10, assume that it is desired to first test the continuity of the connection between the terminals 13 and 132 in the equipment 14. The multiplug (not shown) in which the terminal leads 12, 121 and 122 are embodied would be inserted into a suitable receptacle (not shown) in which the leads 13, 131 and 132 are embodied so that an electrical connection is effected between the lead terminals 12, 121, 122 and 13, 131, 132, respectively, as discussed hereinabove. Although the procedure for continuity testing only one pair of terminal leads 13 and 132 will be described hereinafter, it will be understood that the same procedure applies when other pairs or groups of terminal leads in the equipment 14 are to be tested. After the lead terminals 12, 13, 121, 122, 131 and 132 are properly connected, the test set 10 is programmed to operate relays 16 and 162 only. These two relays will be held operated by their holding circuits 31 and 312 and will cause terminal circuits 11 and 112 to be in the "ground check" condition. The ground connected to the lead 38 can be traced to the junction 36 in the circuit 11 and the junction 362 in the circuit 112 over operated contacts of relays 16 and 162 and through the conductors in the unit 14 under test which terminate at the terminals 13 and 132 respectively. The ground on the junctions 36 and 362 will prevent operation of the visual indicators 18 and 182 and also prevent operation of the associated ground check relay 21. If due to faulty wiring in the unit 14, the terminal 13 is not connected to the terminal 132, ground will not appear at the junction 362. In this case the visual indicator 182 and the ground check relay 21 will operate as an indication of trouble. It can thus be seen that each selected pair of branch circuits, for example, 11, 112, through the operation of their respective relays 16, 162, are placed in a continuity test circuit condition and, as such, actually constitute continuity test circuit portions of their respective branch circuits.

While the continuity check is proceeding in circuits 11 and 112, all other circuits such as the terminal circuit 111 and a similar associated terminal circuit (not shown) would have their relays, such as the relay 161, in the normal or unoperated position, which is the "open check" position. Stated another way, each branch circuit, such as 111, having an unoperated relay 161, is placed in a short-circuit test condition and, as such, constitutes a short-circuit test portion of the associated branch circuit. Under normal conditions, none of the associated visual indicators, such as the indicator 181, or the "open check" relay 20 would operate. If, however, due to faulty wiring in the unit 14 under test, ground should appear at the terminal 131, the visual indicator 181 and the "open "check" relay 20 would operate and indicate the existence of this condition.

The test set 10 is then programmed to release relays 16 and 162 and to operate other combinations of terminal circuit relays until all wires in the unit 14 have been checked for continuity. In the event there is an improper ground in the terminal circuit 11, when the relay 16 is in the normal or unoperative position, as shown in the drawing, the indicator 18 will light to indicate this condition.

It will be evident to those skilled in the art that the ground lead 38 is common to all successive terminal circuits since this lead is connected in a conventional lockout chain (not shown) to a corresponding pair of contacts in each terminal circuit. In addition, it will be evident to those skilled in the art that any terminal circuit may be used in combination with any other terminal circuit or circuits in the test device 10 as required to test any combination of conductors in the unit 14. The test device 10 is particularly useful for testing the wiring between connectors on units which utilize plug-in apparatus components, such as printed circuit boards. In this instance, the test device 10 is plugged into the connectors in place of the plug-in apparatus.

What is claimed is:

1. A circuit for testing electrical apparatus for circuit continuity between specified terminals therein and for detecting short-circuit conditions between any of the terminals and ground potential normally isolated therefrom comprising:
   a plurality of branch testing circuits each associated with a different pre-assigned terminal to be tested, each of said branch circuits including a continuity test portion and a short-circuit test portion selectively connectible to said pre-assigned terminal;
   a plurality of indicating means respectively associated with said branch circuits and selectively connectible into said continuity and short-circuit test portions thereof;
   a plurality of first signal sources respectively associated with each of said branch circuits and selectively connectible into said continuity test portions thereof in energizable relationship with said indicating means;
   a plurality of operable switching means respectively associated with each of said branch circuits, said switching means when operated in selected pairs connecting the respective continuity test portions of the two associated branch circuits to the assigned terminals under test, each of said operated ones of said switching means also connecting the first signal source and indicating means of the associated branch circuit into the continuity test portion thereof, with continuity existing between and through the terminals under test, one of said pair of operated switching means normally short-circuiting to ground potential the indicating means in the continuity test portions of both branch circuits associated with said pair of operated switching means to prevent either of said connected first signal sources from energizing either indicating means, and in the absence of circuit continuity between said terminals under test which opens the short-circuiting connection to ground potential of one of said last-mentioned indicating means, the one of said pair of operated switching means related of said undergrounded indicating means connecting the continuity test portion of the associated branch circuit, together with the first signal source and said last-mentioned indicating means associated therewith in series circuit relationship to ground potential, said last-mentioned ground potential completing an active circuit for effecting the energization of said last-mentioned indicating means to evidence an open circuit condition between the terminals being tested for continuity; and
   a second signal source common to all of said branch circuits, each of said unoperated switching means normally connecting said second signal source through the short-circuit test portion and indicating means of the branch circuit associated with that unoperated switching means to the terminal assigned to that branch, the existence of an undesired short-circuit condition to ground potential of any terminal connected to said second signal source completing an active circuit to energize the indicating means associated with that terminal to indicate the fault.

2. A circuit for testing electrical apparatus in accordance with claim 11 wherein first relay means is connected in series with said second signal source and is connectible by each unoperated switching means into the short circuit test portion of each associated branch circuit, said first relay means being energized in response to a short-circuit to ground of any terminal associated with an unoperated switching means to provide an auxiliary test circuit function, and wherein second relay means forming a ground return path is connectible by each operated switching means into the continuity test portion of each associated branch circuit, said second relay means being energized in response to an open-circuit condition existing between any two terminals under test associated with two operated first switching means to provide an auxiliary test circuit function.

3. A circuit for testing electrical apparatus for circuit continuity between specified terminals therein and for detecting short-circuit conditions between any of the terminals and ground potential normally isolated therefrom comprising:
   a plurality of branch testing circuits each associated with a different pre-assigned terminal to be tested, each of said branch circuits including a continuity test portion and a short-circuit test portion selectively connectible to said pre-assigned terminal;
   a plurality of indicating means respectively associated with said branch circuits and selectively connectible into said continuity and short-circuit test portions thereof;
   a plurality of first power supply means respectively associated with each of said branch circuits and selectively connectible into said continuity test portions thereof in energizable relationship with said indicating means;
   first test circuit ground means selectively and successively connectible to the continuity test portions of said branch circuits;
   a plurality of operable, multi-contact switching relays respectively associated with each of said branch circuits, said relays when operated in selected pairs connecting through operated contacts thereof the respective continuity test portions of the two associated branch circuits to the assigned terminals under test, each of said operated ones of said switching relays through associated contacts thereof also connecting the first power supply means and said indicating means into the continuity test portion of the associated branch circuit, with circuit continuity existing between and through the terminals under test, contacts of one of said pair of first operated relays normally connecting the indicating means in the continuity test portions of both branch circuits associated with said pair of operated relays to said first ground means to prevent either of said connected first power supply means from energizing either indicating means;
   a second test circuit ground means selectively connectible to said continuity test circuit portions of said respective circuit branches, one of said pair of operated switching relays through associated contacts thereof, in the absence of circuit continuity between said terminals under test which opens the normal connection to said first ground means of one of said last-mentioned indicating means, connecting the continuity test portion of the associated branch circuit related to said ungrounded indicating means, together with the first signal source and said last-mentioned indicating means associated therewith in series circuit relationship to said second ground means, said second ground means completing an active circuit for effecting the energization of said last-mentioned indicating means to evidence an open-circuit condition between the terminals being tested for continuity; and second power supply means common to all of said branch circuits, each of said unoperated switching relays through associated contacts thereof normally connecting said second power supply means through the short-circuit test portion and indicating means of the branch circuit associated with that unoperated switching relay to the terminal assigned to that branch, the existence of an undesired short-circuit condition to ground potential of any terminal connected to said second power supply means completing an active circuit to energize the indicating means associated with that terminal to indicate the fault.

References Cited by the Examiner

UNITED STATES PATENTS

| | | | |
|---|---|---|---|
| 2,762,014 | 9/1956 | Anderson | 324—73 |
| 2,849,677 | 8/1958 | Hannon | 324—73 |

FREDERICK M. STRADER, *Primary Examiner.*

WALTER L. CARLSON, *Examiner.*